(12) United States Patent
Chuang et al.

(10) Patent No.: US 9,184,427 B2
(45) Date of Patent: Nov. 10, 2015

(54) BATTERY ASSEMBLY WITH HIGH THERMAL CONDUCTIVITY

(75) Inventors: Chia-Ming Chuang, Taipei (TW);
David YuanJei Tse, Taipei (TW)

(73) Assignee: ATIEVA, Inc., Menlo Park, CA (US)

( * ) Notice: Subject to any disclaimer, the term of this patent is extended or adjusted under 35 U.S.C. 154(b) by 140 days.

(21) Appl. No.: 13/371,426

(22) Filed: Feb. 11, 2012

(65) Prior Publication Data
US 2013/0136958 A1    May 30, 2013

(30) Foreign Application Priority Data

Nov. 30, 2011    (CN) .......................... 2011 1 0389264

(51) Int. Cl.
| | | |
|---|---|---|
| H01M 10/02 | (2006.01) | |
| H01M 10/50 | (2006.01) | |
| H01M 4/64 | (2006.01) | |
| H01M 2/06 | (2006.01) | |
| H01M 2/20 | (2006.01) | |
| H01M 2/10 | (2006.01) | |
| H01M 10/654 | (2014.01) | |
| H01M 10/643 | (2014.01) | |
| H01M 10/613 | (2014.01) | |
| H01M 10/659 | (2014.01) | |
| H01M 10/48 | (2006.01) | |
| H01M 10/653 | (2014.01) | |
| H01M 10/623 | (2014.01) | |

(52) U.S. Cl.
CPC ................ *H01M 2/105* (2013.01); *H01M 2/20* (2013.01); *H01M 2/204* (2013.01); *H01M 10/613* (2015.04); *H01M 10/643* (2015.04); *H01M 10/654* (2015.04); *H01M 10/659* (2015.04); *H01M 2/1094* (2013.01); *H01M 10/486* (2013.01); *H01M 10/623* (2015.04); *H01M 10/653* (2015.04); *H01M 2200/103* (2013.01)

(58) Field of Classification Search
USPC .................... 429/50–56, 96–100, 149–160, 429/163–187, 161, 123, 53–56
See application file for complete search history.

(56) References Cited

U.S. PATENT DOCUMENTS

| | | | |
|---|---|---|---|
| 5,340,672 A | 8/1994 | Kubota et al. | |
| 6,051,336 A * | 4/2000 | Dougherty et al. | ........... 429/149 |
| 6,377,432 B1 * | 4/2002 | Hashimoto | ................ 361/104 |
| 6,811,921 B2 * | 11/2004 | Dansui et al. | ................... 429/99 |
| 7,316,863 B2 * | 1/2008 | Sato | ............................ 429/158 |
| 2002/0098410 A1 * | 7/2002 | Leysieffer et al. | .............. 429/61 |
| 2004/0241541 A1 * | 12/2004 | Watanabe et al. | ............. 429/163 |
| 2005/0089750 A1 * | 4/2005 | Ng et al. | ....................... 429/120 |
| 2009/0208820 A1 * | 8/2009 | Nishino et al. | .................. 429/56 |
| 2010/0028758 A1 * | 2/2010 | Eaves et al. | .................... 429/50 |
| 2010/0151308 A1 | 6/2010 | Hermann et al. | |

* cited by examiner

*Primary Examiner* — Basia Ridley
*Assistant Examiner* — Caitlin Wilmot
(74) *Attorney, Agent, or Firm* — Womble Carlyle Sandridge & Rice LLP

(57) ABSTRACT

The invention relates to a battery assembly with high thermal conductivity. The battery assembly comprises a metal case having a hollow accommodation cavity formed therein, a plurality of battery cores installed parallel to one another within the metal case, and a common electrode for connection to the other electrode in each of the battery cores. Each of the battery cores has two electrodes, with one of the electrodes that corresponds to those of the rest of the battery cores being connected in a thermally conductive manner to the metal case. The invention takes advantage of high thermal conductivity of metallic material and dissipates heat by connecting the metal case to the battery electrodes. The invention further comprises fixation troughs formed on the metal case, thereby reducing the size of the assembly.

20 Claims, 13 Drawing Sheets

BATTERY ASSEMBLY WITH HIGH THERMAL CONDUCTIVITY

BACKGROUND OF THE INVENTION

1. Field of the Invention

The present invention relates to a battery assembly with high thermal conductivity and, more particularly, to a highly thermal conductive battery suitable for use in a battery engine of an electric-powered vehicle.

2. Description of Related Art

The presence of battery technologies initiates the domination over electric power by human kind. From the Leyden jar and voltaic pile to the modern lithium-ion battery, it is possible now to provide electric power of greater magnitude and higher power when people separate themselves from a power supply area, thus allowing utilization of machines and tools requiring high power. Safety issues on batteries in electronic communication products such as general mobile phones or computers often attract people's attention through news broadcasts, but the battery installed within such electronic devices in fact usually contains only one battery core or probably at most three. Comparatively, for driving large-scaled electric-consuming appliances like electric-powered vehicles, usually it requires a battery array, composed of a greater amount of batteries connected in serial or in parallel, to supply electric power of high voltage and mega-current.

However, upon connecting together a large amount of batteries, the massive heat generated when the mega-current flows through resistors may become very challenging for operation of the battery set. On one hand, the elevated temperature may reduce the conductivity in the metal, such that the power supply deviates from a predetermined range. On the other hand, such a temperature increase may also cause the battery cores to swell, resulting in undesirable mutual squeezing among adjacent battery cores thus leading to increased risks of rupture, battery solution leakage or even combustion or explosion. In a worse case, once battery core breakup or battery solution leakage indeed occurs in any one of the battery cores, short-circuit problem of adjacent battery cores may accordingly happen thus leading to unexpected instantaneous release of massive electric current. Therefore it has been one of major research subjects for the industry to effectively dissipate such generated heat.

FIG. 1 shows a common heat dissipation design that provides a solution to the problems described above, wherein each battery 2 is provided with heat sink cooling fins at its lateral sides, thereby further creating gaps among neighboring batteries 2. Using forced air convections through air blow generated by a fan 20, it is possible to carry heat energy away from the lateral sides of batteries 2 and the cooling fins. Unfortunately, in a conventional lithium secondary battery or a like battery, metallic material and thermal conductive material are mainly mounted along the direction from the top face 21 to the bottom face 22, but the battery solution with poor heat conductivity is filled within the space between the central axis of the battery core and the lateral sides, thus significantly increasing the heat resistance thereof. In other words, even though the distance between the top face and the bottom face is much greater than that between the opposite lateral sides, heat conductivity for the battery core toward its top face and bottom face is more efficient than toward the lateral faces. Consequently, heat dissipation in the aforementioned process, no matter through cooling fins or forced convections, is mostly addressed to the portions with poor thermal conductivity or limited heat accumulation capability, rather than areas where the most effective heat removal feature can be offered.

SUMMARY OF THE INVENTION

Accordingly, an objective of the present invention lies in providing a battery assembly with high thermal conductivity, in which the metal electrodes of the battery cores and the metal case are directly connected in a thermally conductive manner, thereby achieving efficient heat dissipation.

Another objective of the present invention is to provide a battery assembly with high thermal conductivity, in which multiple battery cores of standard specification are disposed within a case of particular specification.

Yet another objective of the present invention is to provide a battery assembly with high thermal conductivity, in which multiple battery cores are independently provided with a fuse device, thereby independently removing respective failed battery cores from the circuit upon occurrence of individual battery core failure.

The invention therefore provides a battery assembly with high thermal conductivity. The battery assembly comprises a metal case having a hollow accommodation cavity formed therein, a plurality of battery cores installed parallel to one another within the metal case, and a common electrode for connection to the other electrode in each of the battery cores. Each of the battery cores has two electrodes, with one of the electrodes that corresponds to those of the rest of the battery cores being connected in a thermally conductive manner to the metal case.

By means of the structural arrangement described above, the multiple battery cores mounted in the battery assembly according to the invention are connected at the electrodes thereof to the metal case in a thermally conductive manner, such that the battery cores are capable of rapidly transferring the generated heat to the metal case along the axial direction that has proved to offer better efficiency for heat dissipation. In addition, each of the battery cores is individually installed in connection with a fuse, and by means of such a structural design, in case that any one of the battery cores fails and becomes inoperable, it is possible to immediately break it off from the power supply system thereby preventing the rest adjacent battery cores from being damaged due to short-circuit problem.

The present invention also provides a battery assembly with improved metal case, wherein the metal case is cut-in to form a plurality of notches used as the fixation troughs for receiving respective batteries. Herein the fixation troughs may be even perforated, such that the batteries installed within the battery assembly can be partially exposed outside of the case. Such a metal case configuration aims to achieve two goals: first, allowing fastening of the respective batteries; and second, forming an accommodation space inside the metal case for receiving the batteries so that the battery assembly may flinch inward thereby reducing the size thereof.

Consequently, the present invention can resolve heat dissipation restrictions found in prior art through the structural arrangement disclosed herein. It enables heat dissipation by way of locations characterizing in optimal thermal conductivity and most significant heat energy accumulation thereby greatly elevating heat dissipation efficiency. Additionally, the case of battery assembly is improved with the size thereof reduced, thus accordingly increasing versatility for battery assembly applications.

DETAILED DESCRIPTION OF THE PREFERRED EMBODIMENTS

The present invention discloses a battery assembly with high thermal conductivity, comprising a hollow metal case, a plurality of batteries installed parallel to one another within the metal case. Each of the batteries includes a battery core having two electrodes, with one electrode that corresponds to those of the rest of the battery cores being connected in a thermally conductive manner to the metal case, and a common electrode for connection to the other electrode in each of the battery cores.

Figure 1:
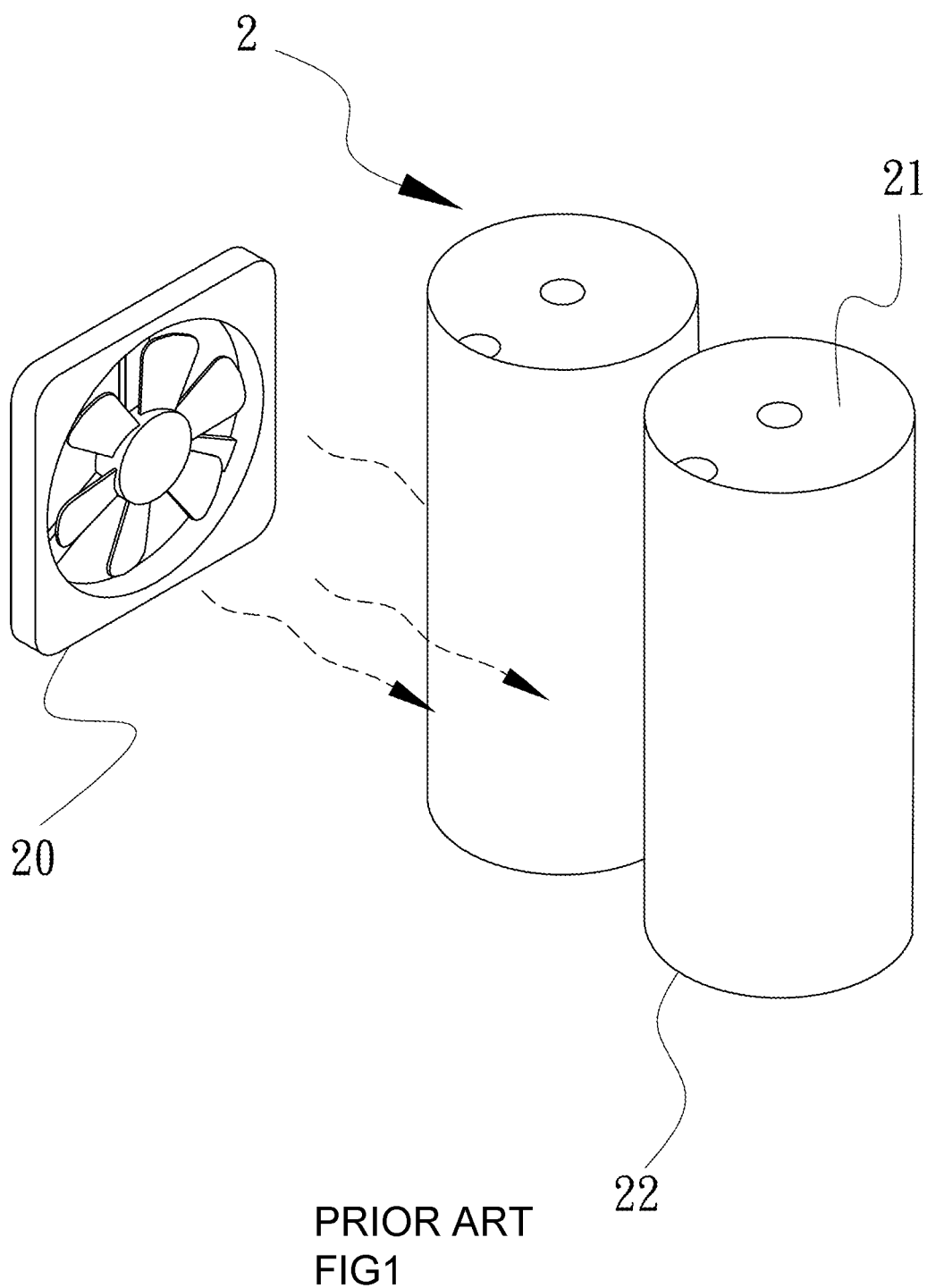
FIG. 1 is a schematic diagram showing the external case of a conventional battery set.
Figure 2:
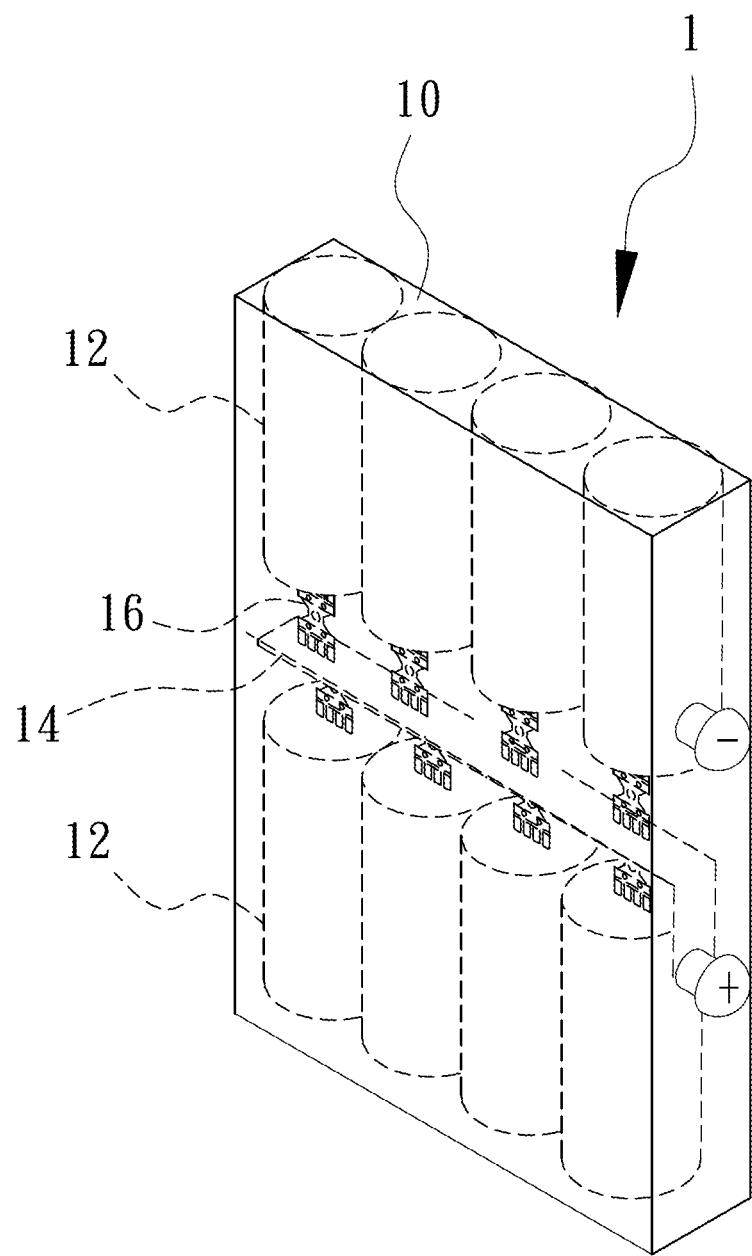
FIG. 2 is a schematic diagram showing major components of the present invention.

The battery cores are connected in a thermally conductive manner to the metal case, in which the electrodes brought into contact with the metal case are exemplified as the negative poles of the battery cores according to the present embodiment. Such an arrangement allows full exploitation of high thermal conductivity in metallic material for battery cooling. Further structural improvement was made to bring the metallic negative poles of the battery cores into direct contact with the metal case, as described below. Referring to FIG. 2, a highly thermal conductive battery assembly 1 according to the invention comprises a metal case 10 which accommodates a plurality of battery cores 12 capable of providing electric energy. The negative pole of each battery core 12 is directly connected conductively to the metal case 10, so as to perform rapid heat dissipation by virtue of high thermal conductivity of the metallic material. The positive pole of each battery core 12 is connected in a conductive manner to a common electrode 14, whereas a fuse device 16 is further installed between the positive pole and the common electrode 14.

Figure 3:
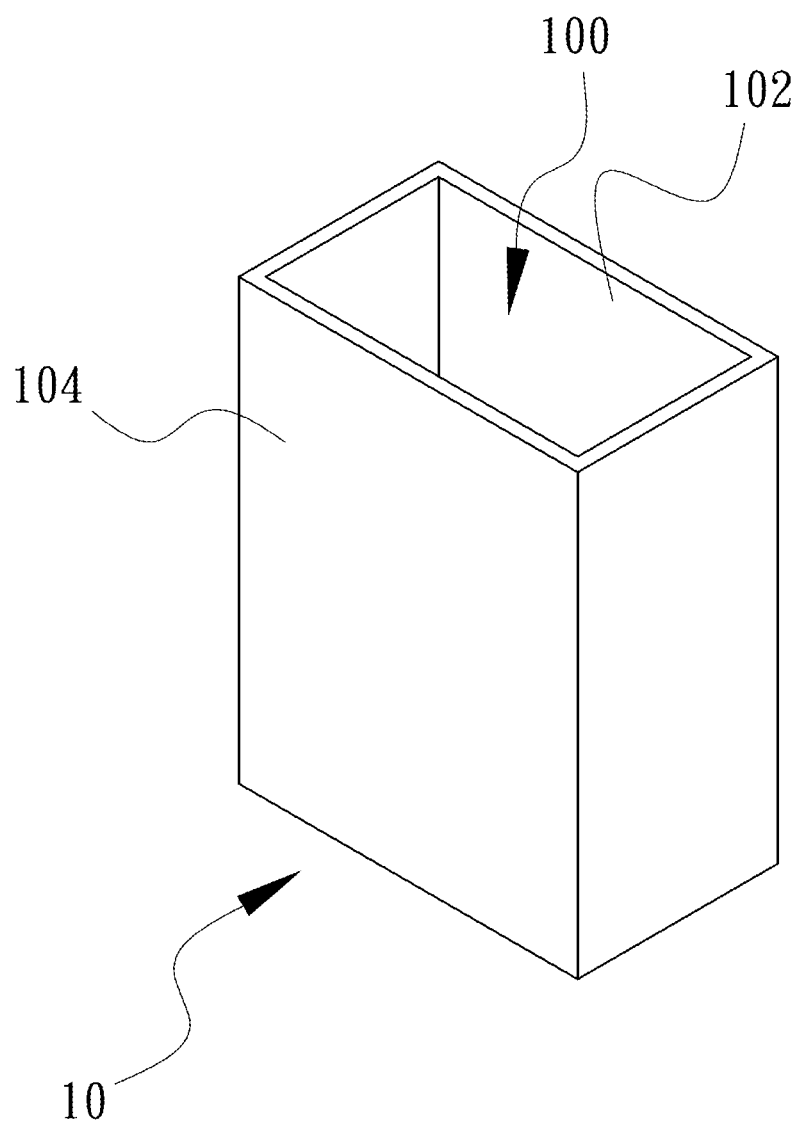
FIG. 3 s is a schematic diagram showing the metal case of the present invention.
Figure 4:
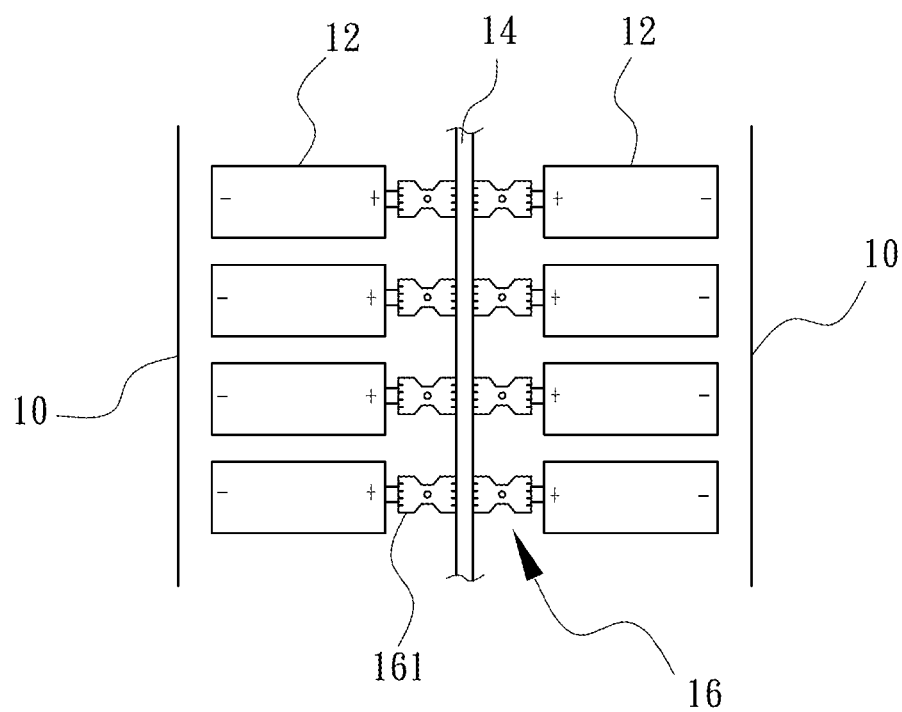
FIG. 4 shows a lateral cross-sectional view of the invention.
Figure 5:
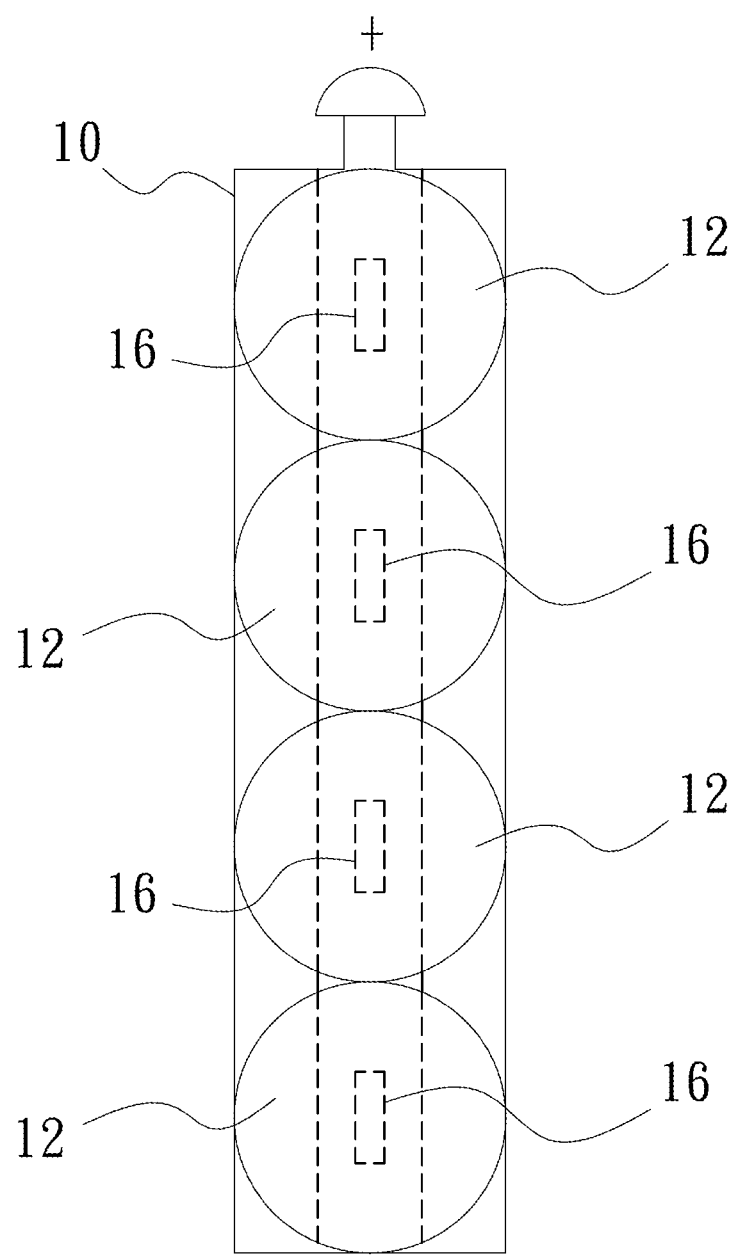
FIG. 5 shows a top perspective view for the embodiment in FIG. 4.

FIG. 3 shows a perspective view of the metal case 10, wherein the metal case 10 includes an interior side 102 and an exterior side 104 facing oppositely to the interior side 102. The central hollow portion serves as a hollow accommodation cavity 100 for placement of the battery cores 12, the common electrode 14, as well as the fuse device 16 attached between them. Next, referring conjunctively to FIGS. 4 and 5, the battery cores 12 according to this embodiment are arranged in upper and lower rows, with four battery cores 12 being allocated in each row. The battery cores 12 in the upper row are positioned opposite to those in the lower row. The positive pole of each battery core 12 is directly connected conductively to the metal case 10, such that the metal case 10 acts as common ground with a zero potential, referred as a common negative pole.

Since the upper and lower rows of the battery cores 12 are reversely arranged, the positive poles of the battery cores 12 in the upper row facing the positive poles of the battery cores 12 in the lower row. A common electrode 14 is further installed between the positive poles of the battery cores 12 in the upper row and the positive poles of the battery cores 12 in the lower row, thereby forming a positive pole circuit connected conductively to outside of the metal case 10. Besides, in the present embodiment, a fuse device 16 is further installed between the common electrode 14 and the positive poles of the battery cores 12. Said fuse device 16 include a plurality of fuse wires 161, with each fuse wire 161 having a low-melting-point fusible portion corresponding to a battery core 12. As such, in case that a certain battery core 12 becomes short-circuit and excessive electric current occurs, overmuch heat energy may accumulate at the corresponding narrow fusible portion, thereby melting down one single fuse wire 161 to form an open circuit, so as to coercively isolate the damaged battery. A skilled person in the art will readily appreciate that the fuse device described herein is by no means limited to be installed at the positive poles of the battery cores, but can be applicably connected to the negative poles.

Figure 6:
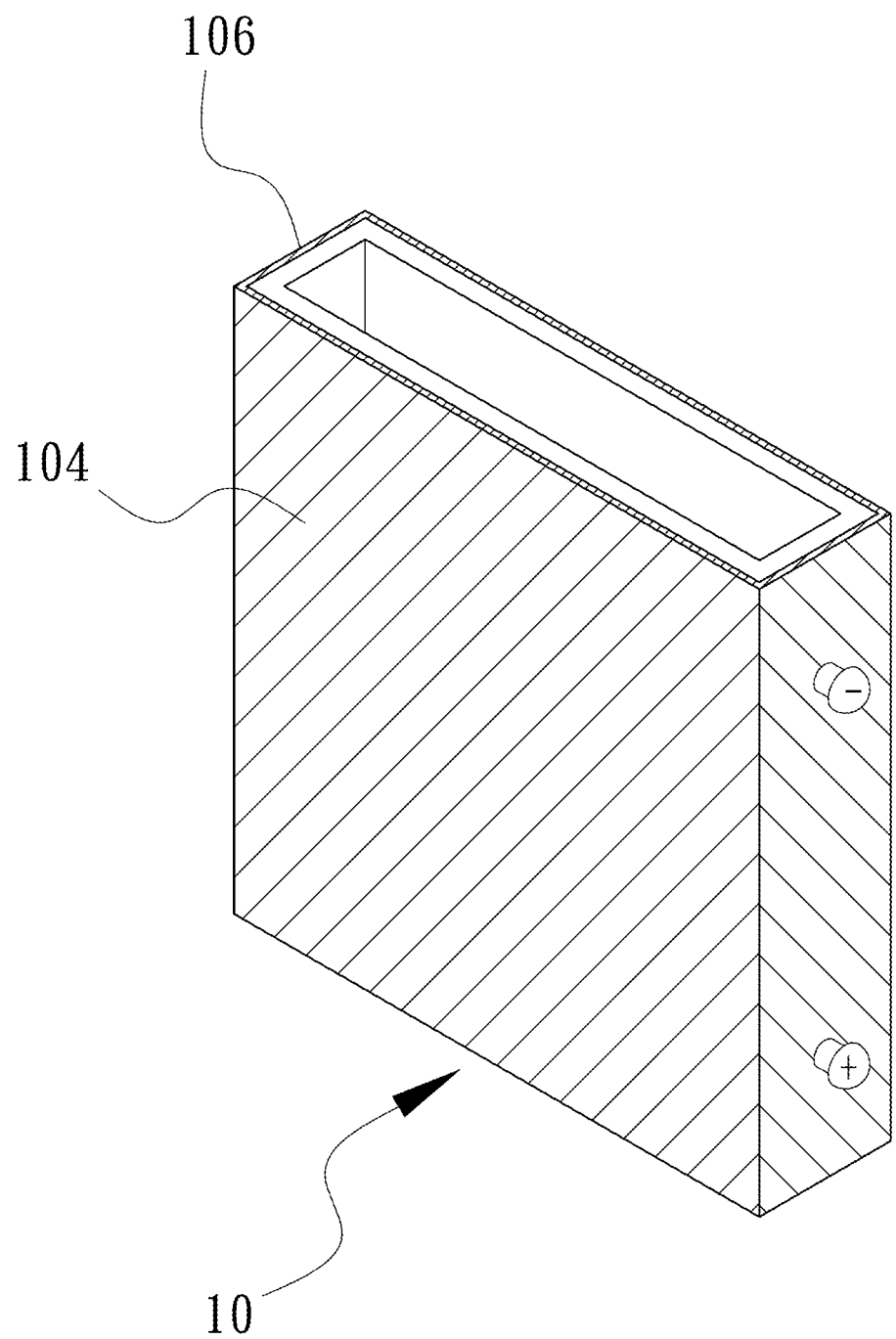
FIG. 6 is a schematic diagram showing the metal case with an insulating outer surface layer according to a second preferred embodiment of the invention.

FIG. 6 shows a second preferred embodiment according to the invention. In order to eliminate the safety concerns about possible direct contact with the metal case acting as the common electrode by a user, an insulating outer surface layer 106 is formed on the exterior side 104 of the metal case 10 by means of the Conversion Coating technology, e.g., anodizing treatment and the like, to allow oxidization of the metallic material in the metal case 10 close to the exterior side 104.

Figure 7:
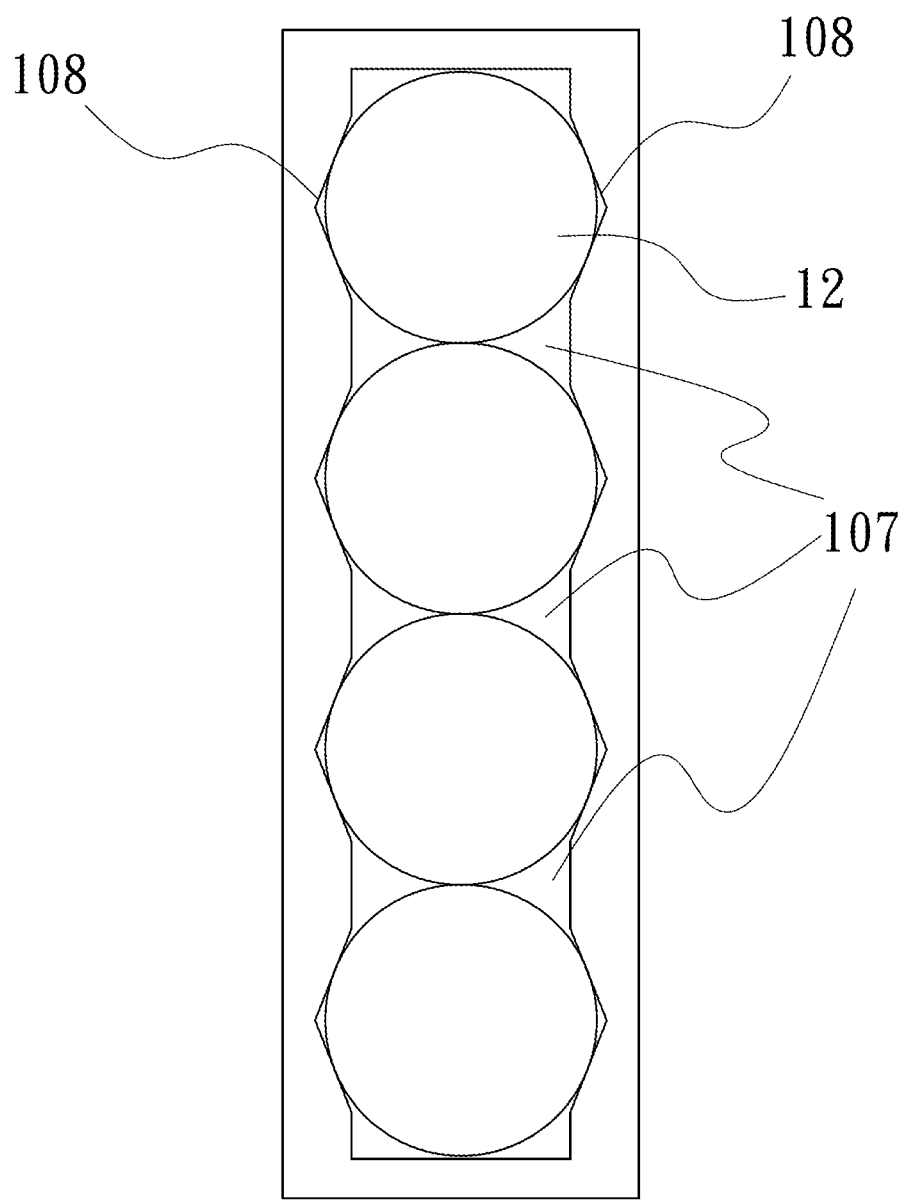
FIG. 7 shows a top view for the metal case with a fixation trough according to a third preferred embodiment of the present invention.
Figure 8:
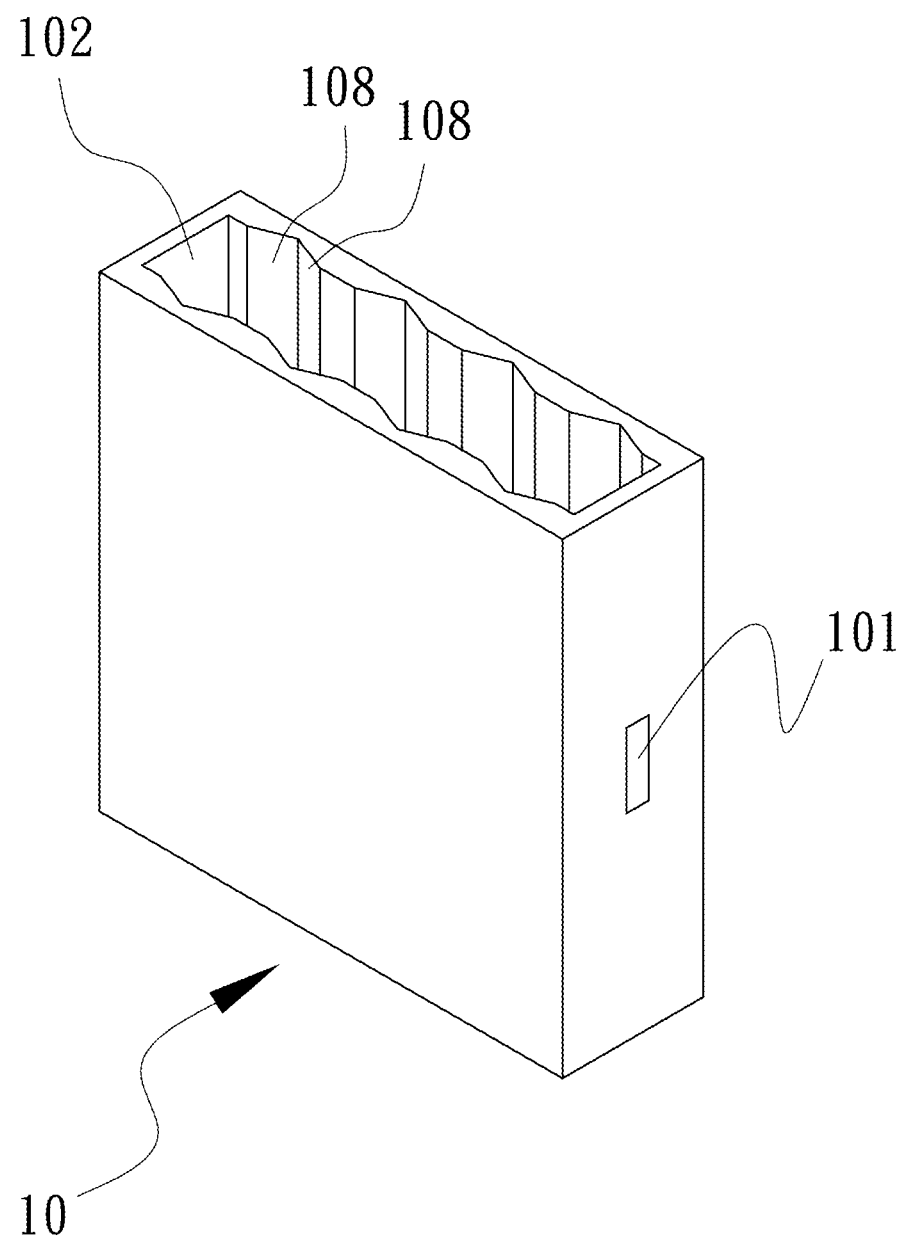
FIG. 8 shows a perspective view for the embodiment in FIG. 7.

Generally speaking, the size of the metal case 10 cannot be readily altered due to the limit by the standard specifications of commonly used battery cores. Hence, in a third preferred embodiment of the invention as shown in FIGS. 7 and 8, the interior side 102 of the metal case 10 is cut in to form a number of fixation troughs 108 on the internal wall. The fixation troughs 108 are used for both buckling the respective battery cores 12 in position and also effectively reduce the overall size of the metal case 10. In this embodiment, the interior of the metal case 10 may be additionally filled with a phase change material 107. Upon mounting a battery assembly onto an electric-powered vehicle, for example, the temperature limit of the battery assembly would be approximately 60° C. However, as leaving the electric-powered vehicle under the sunshine, the internal temperature may reach 4-50° C. which undesirably allows a pretty narrow temperature safety tolerance range. Consequently, in this embodiment, because the phase change material 107 filled in the gap between the metal case 10 and the battery core 12 is in a solid state within 4-50° C. and turns into a liquid by absorbing heat energy as temperature approaching 60° C., it is possible to precisely control the overall temperature without going beyond the specification. An exhaust valve 101 may be installed on the metal case, thereby allowing release of high gas pressure generated by chemical reactions in the battery so as to prevent gaseous bursts of the metal case. The exhaust valve 101 can be automatically activated to open up for pressure release in case the internal pressure of the case elevates beyond a safety threshold.

Figure 9:
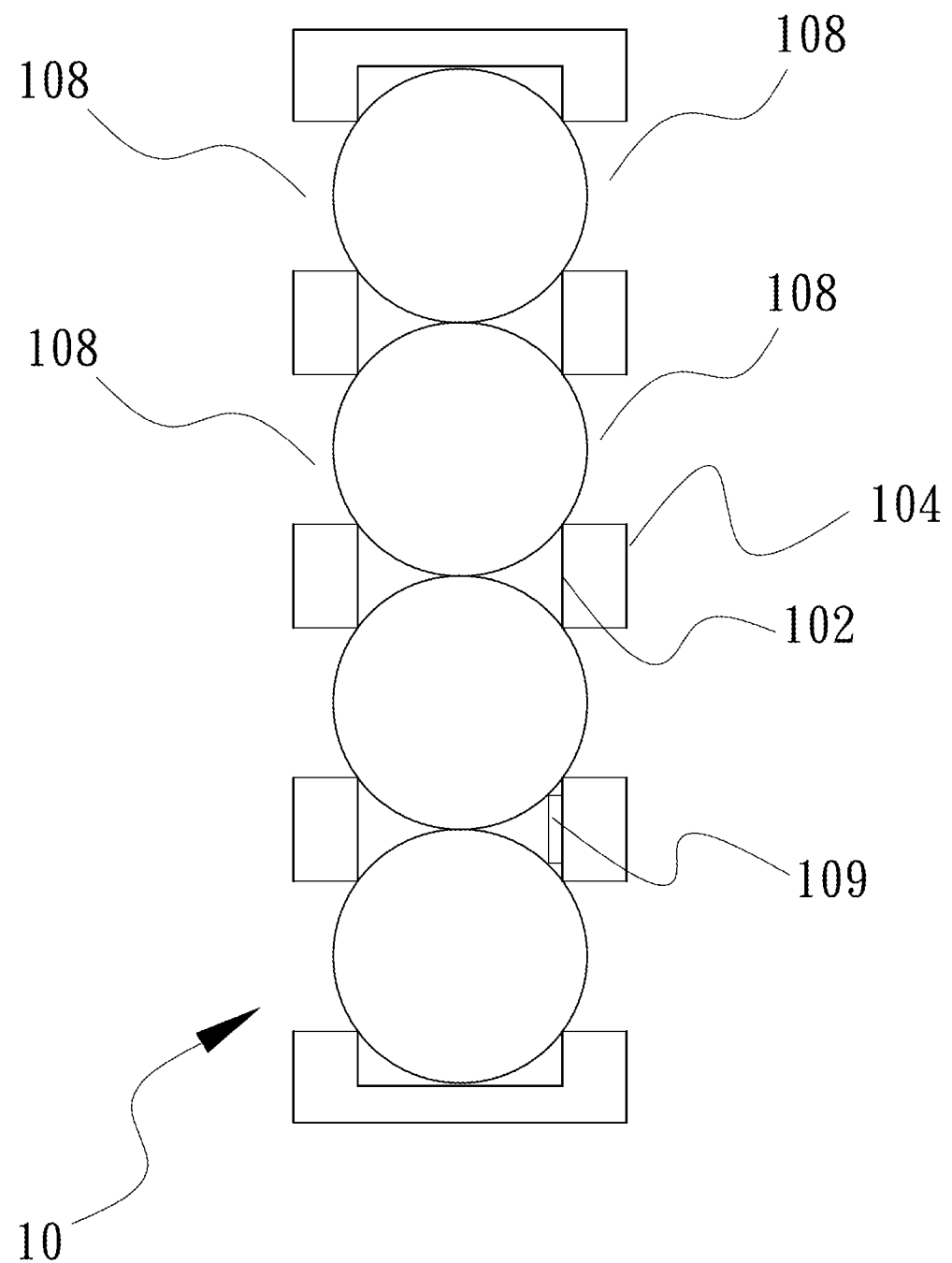
FIG. 9 shows a top view for the metal case with pierced fixation troughs in a fourth preferred embodiment of the present invention.
Figure 10:
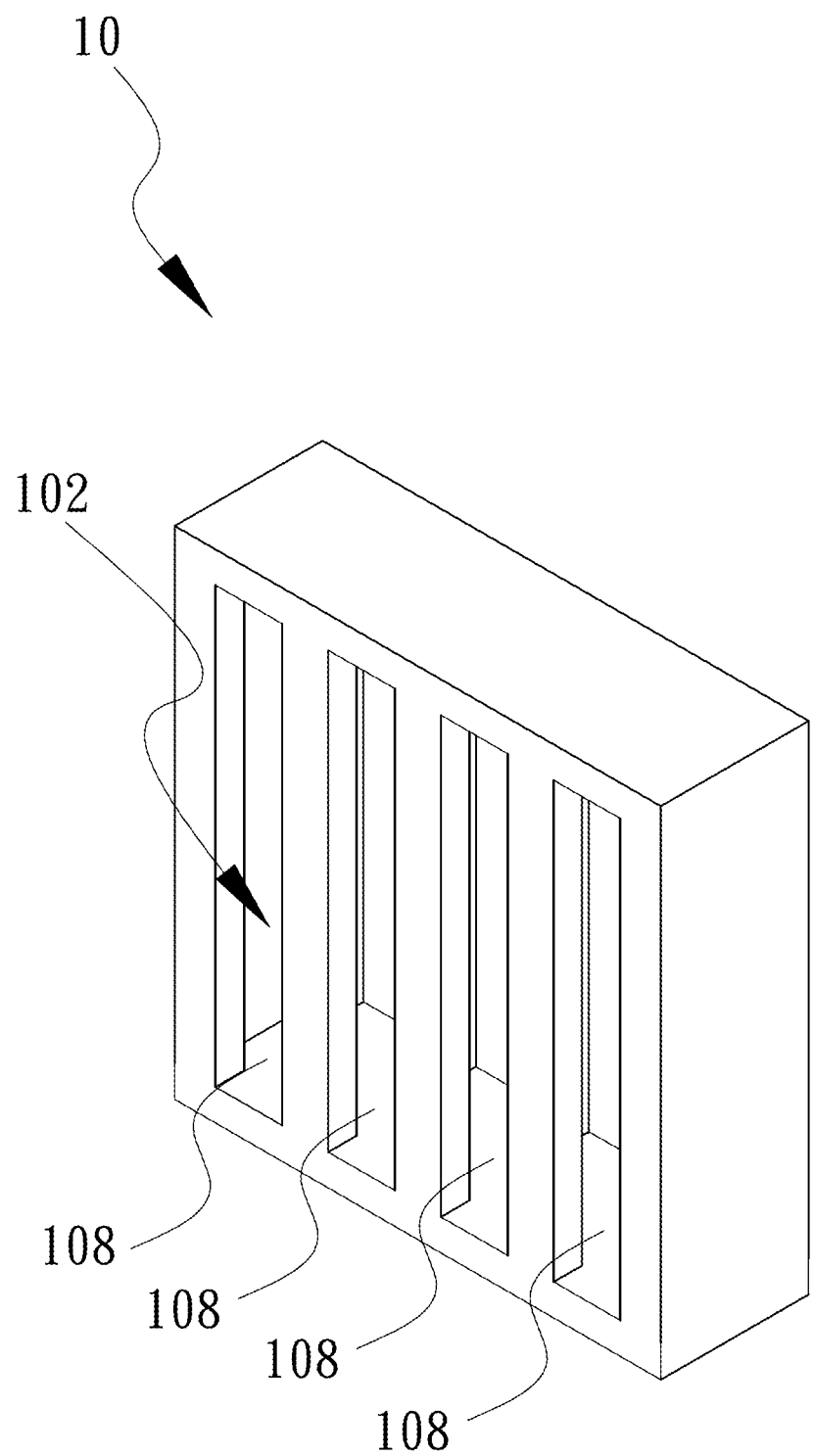
FIG. 10 shows a perspective view for the embodiment in FIG. 9.

According to a fourth preferred embodiment of the invention shown in FIGS. 9 and 10, the fixation troughs 108 may be further deepen, such that the deepest portions thereof extend across the thickness of the metal case 10 to form perforated areas. In this way, the essential thickness of the metal case 10 can be minimized and the overall perimeter thereof can be reduced significantly. In addition, a temperature sensor 109 can be further installed within the metal case 10 and used for detecting whether the temperature within the interior of the metal case 10 exceeds a threshold value and, in that case, generates an alarm signal to notify the user to take rescue actions or temporary avoidance procedures.

Figure 11:
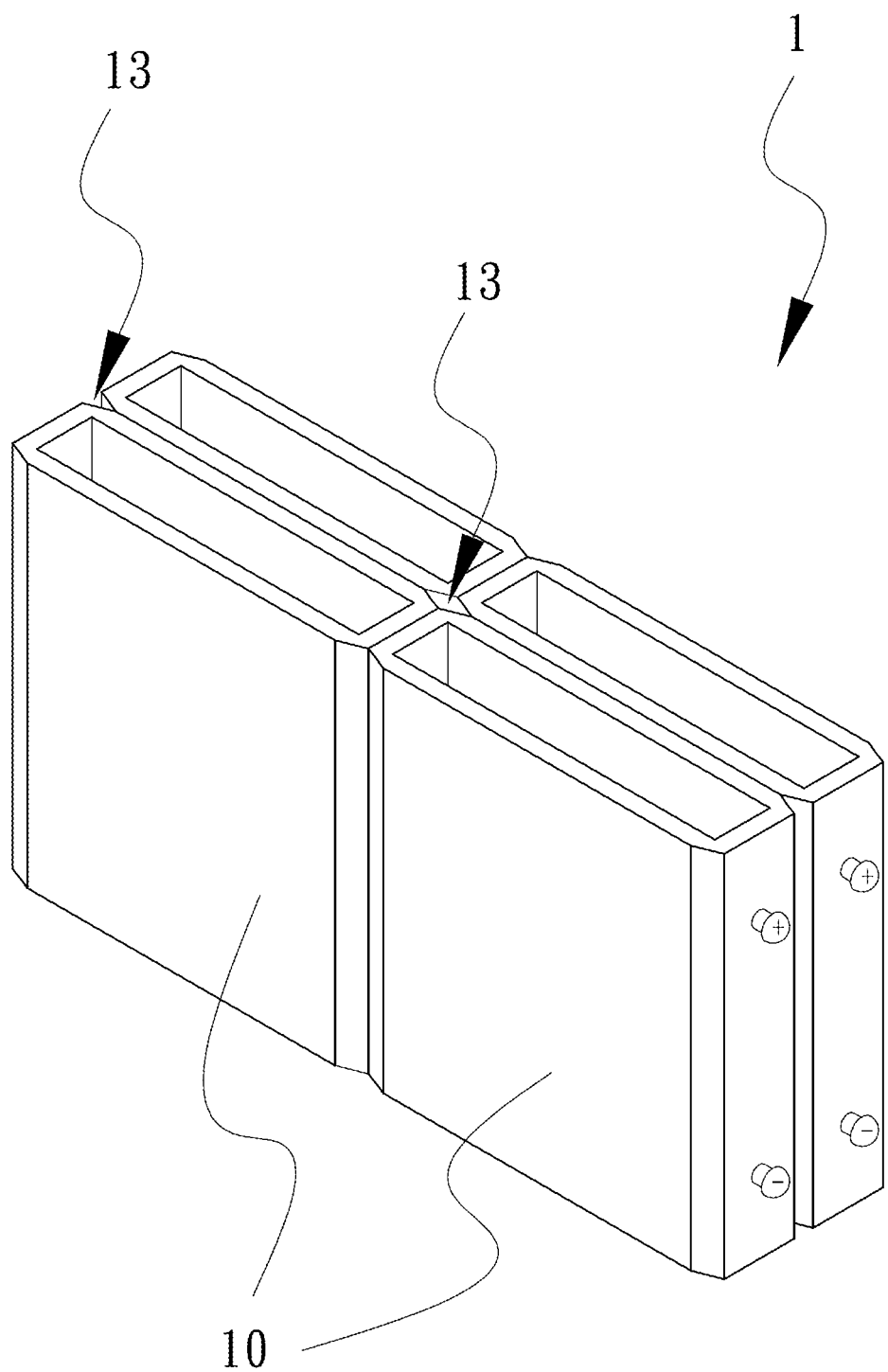
FIG. 11 is a schematic diagram showing the assembling of the metal case according to a fifth preferred embodiment of the present invention, which illustrates how chamfer edges are formed at the corners of a metal case.

Moreover, when the battery assembly described herein is mounted in a comparatively harsh operation environment, such as in an electric-powered vehicle, it is necessary to enhance heat dissipation effect as much as possible within a very limited space that accommodates a greater number of batteries. Accordingly, a fifth preferred embodiment in FIG. 11 shows that the contour of the metal case 10 is substantially cuboid-shaped, and the corners thereof are not right-angled but deliberately chamfered to form an arc-wise chamfer edge 13. As a result, upon combining more than two sets of the highly thermal conductive battery assemblies 1, it is possible to constitute a chamfer edge 13 between the battery assemblies 1. In addition to promoting heat dissipation, the chamfer edge 13 can serve as a pipeline channel and also protect users from being scratched during transportation and placement of the battery assemblies. Of course, the chamfer is not limited to be arc-wise but can be an inclined clip plane as well, which does not restrict the formation of heat dissipation channel or pipeline channel and still ensure the safety of assembly personnel.

Figure 12:
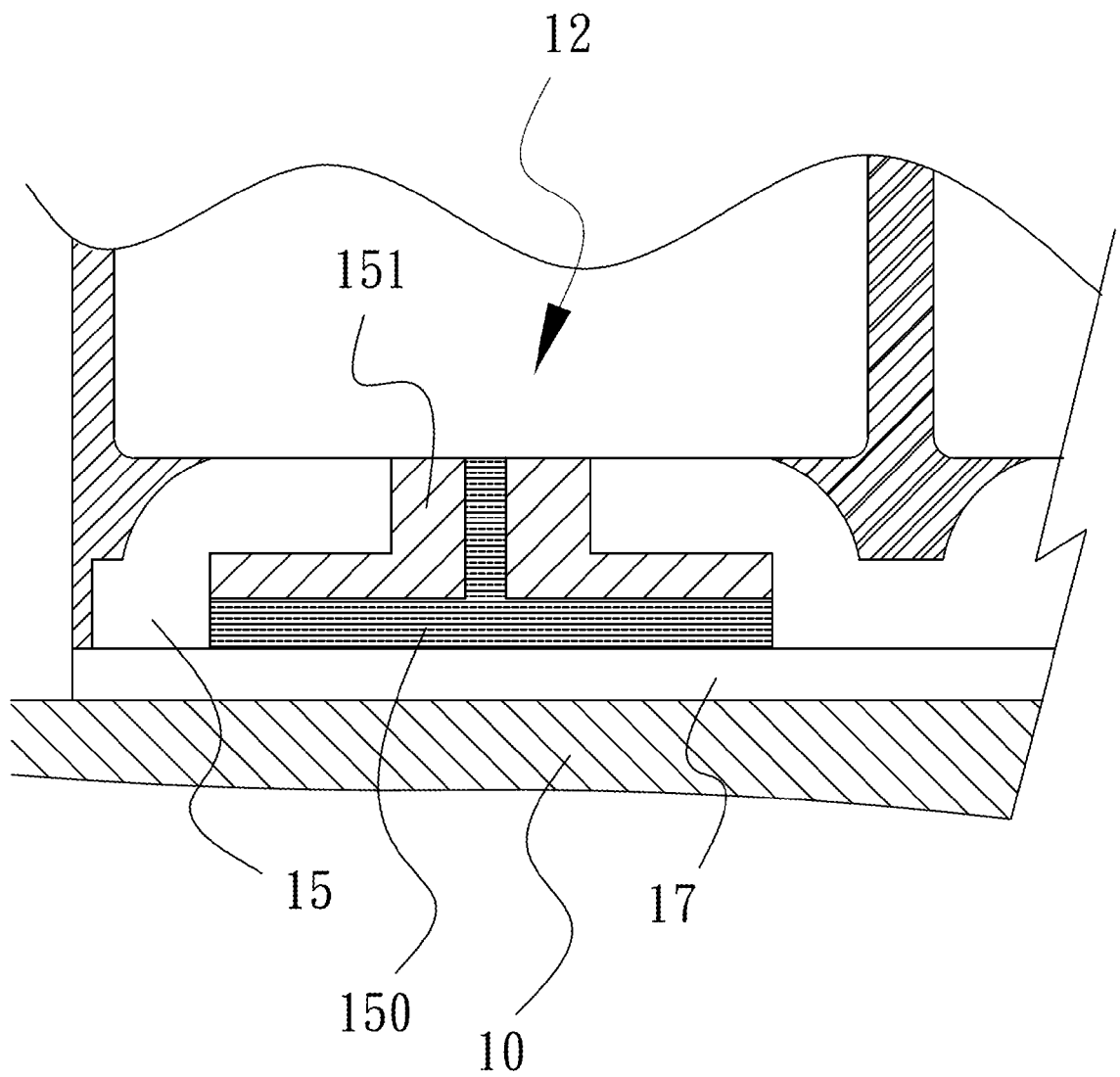
FIG. 12 is a schematic diagram showing the second common electrode of the embodiment in FIG. 11.

Besides, as shown in FIG. 12, a second common electrode 15 may be further installed at each battery core 12 near the metal case 10, rather than directly connected conductively to the metal case 10. A hollow welding wire area 151 is formed in the second common electrode 15 at a position corresponding to each battery core 12, through which a thick conductive wire 150 is welded to connect the second common electrode 15 and an electrode of the battery core 12. Additionally, a thermal conductive flexible gasket 17 is installed between the second common electrode 15 and the metal case 10. As such, when a battery core 12 is pressed downward along an axial direction during an assembling process, the common electrode 15 and the thermal conductive flexible gasket 17 contact tightly with each other upon abutting against the battery core 12, so as to provide a heat dissipation path that directly transfers heat energy from the electrode to the metal case 10 along the axial direction. Such a configuration further provide a cushion between the battery core 12 and the metal case 10, such that vibrations from the electric-powered vehicle will not directly impact the welding point on the battery core 12.

Figure 13:
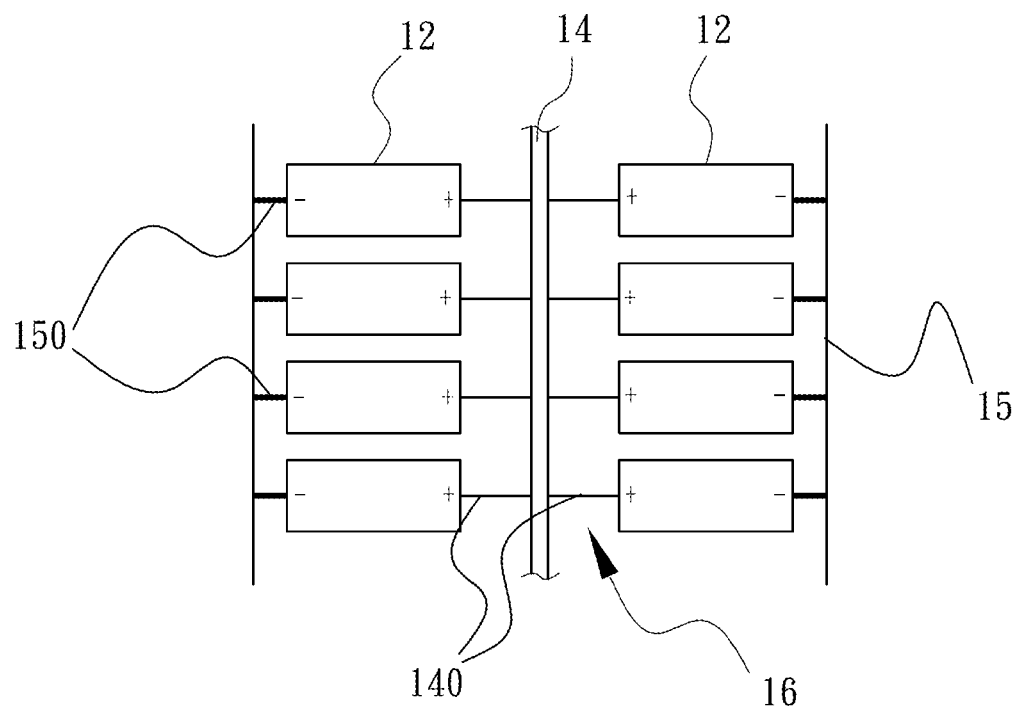
FIG. 13 is a schematic diagram showing the fuse device of the embodiment in FIG. 11.

In this embodiment, since the second common electrode accounts for the common negative pole, the metal case is not subjected to an anodizing treatment. Furthermore, as shown in FIG. 13, the thick conductive wire 150 formed between the battery core 12 and the common electrode 15 as described above is substituted with a thin conductive wire 150 having a smaller diameter, such that the thin conductive wire will be melted down in case the electric current passing through exceeds a predetermined threshold current, thereby offering a feature of the fuse device 16.

Given the fact that a commonly used battery core has a better thermal conductivity along an axial direction from its positive pole to its negative pole, the present invention proceeded against the conventional architecture that dissipates heat along the radial direction of the battery core and developed a positive/negative pole-oriented heat dissipation mode, thereby allowing significant enhancement on the efficiency of thermal conductivity. The installation of a fuse device in the battery assembly further facilitates removal of damaged battery cores without interfering with normal operations in the rest of the battery cores. Meanwhile, the invention makes possible to form a fixation trough on the interior side of the metal case, so as to further reduce the overall size of battery assembly. The invention further allows heat dissipation through the corners of the battery assembly disclosed herein.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A high thermal conductivity battery assembly, comprising:
   a metal case, having a hollow accommodation cavity formed therein;
   a plurality of battery cells, the plurality of battery cells arranged in a first row of battery cells and a second row of battery cells, the first row and the second row installed parallel to one another within the metal case, each of the battery cells having two electrodes with a first electrode of each of the plurality of battery cells in the first row and the second row being connected in a thermally conductive manner to the metal case such that heat generated by each of the plurality of battery cells transfers along an axial direction of the battery cell through the first electrode to the metal case, the first electrode of each of the plurality of battery cells in the first row and the second row connected to the metal case whereby the metal case functions as a common ground;
   a first common electrode extending along a central portion of the hollow accommodation cavity for connection to a second electrode of each of the battery cells, wherein the second electrode of each of the battery cells of the first row are opposed to a first surface of the first common electrode and wherein the second electrode of each of the battery cells of the second row are opposed to a second surface of the first common electrode;
   a second common electrode coupled to a surface of the metal case and the first electrode of each of the plurality of battery cells;
   a thermally conductive flexible gasket having a first surface coupled to the second common electrode and a second surface coupled to the surface of the metal case; and
   a fuse device coupled between each second electrode of each of the battery cells and the first common electrode, such that melting a portion of the fuse device isolates a single one of the battery cells.

2. The battery assembly according to claim 1, wherein the metal case includes an exterior side facing away from the hollow accommodation cavity and an interior side facing toward the hollow accommodation cavity, and wherein each of the battery cells has the axial direction, and wherein a plurality of fixation troughs are formed on the metal case from the interior side toward the exterior side in a manner extending along the axial directions of the respective battery cells.

3. The battery assembly according to claim 2, wherein the fixation troughs extend across the interior side and the exterior side of the metal case.

4. The battery assembly according to claim 1, wherein the fuse device is formed by a stamping process.

5. The battery assembly according to claim 1, wherein the respective battery cells are connected at their negative poles to the metal case in a thermally conductive manner, with their positive poles being connected to the first common electrode, and wherein the fuse device comprises a plurality of fuse wires, each being installed between the first common electrode and a different one of the positive poles of the battery cells so that each of the battery cells has a dedicated fuse.

6. The battery assembly according to claim 1, further comprising at least one exhaust valve installed on the metal case.

7. The battery assembly according to claim 1, wherein the metal case includes an insulating outer surface layer.

8. The battery assembly according to claim 1, further comprising a phase change material filled within the hollow accommodation cavity, and the phase change material has a phase change temperature below a predetermined safety threshold.

9. The battery assembly according to claim 1, further comprising at least one temperature sensor installed within the hollow accommodation cavity.

10. The battery assembly according to claim 1, wherein the metal case is cuboid-shaped and chamfered at corners thereof.

11. The battery assembly according to claim 1, wherein the second common electrode is configured to define a plurality of hollow areas, each hollow area of the plurality of hollow areas corresponding to one of the plurality of battery cells wherein a wire disposed within each hollow area couples the second common electrode to the first electrode of the corresponding one of the plurality of battery cells.

12. The battery assembly according to claim 11, wherein the wire disposed within each hollow area functions as another fuse device.

13. An encased battery assembly, comprising:
a case having a cavity, the case having thermal conductivity and electrical conductivity;
a plurality of battery cells arranged in the cavity as a first row of battery cells parallel to one another and a second row of battery cells parallel to one another;
a first electrode of each battery cell of the plurality of battery cells arranged to conduct heat of the battery cell along a central axis of the battery cell through the first electrode to the case;
the first electrode of each battery cell connected to the case with the case as a common electrical ground for the plurality of battery cells;
a fuse device;
a first common electrode arranged along a central portion of the cavity, with a second electrode of each of the battery cells of the first row facing, and connected by a portion of the fuse device to, a first face of the first common electrode, and with a second electrode of each of the battery cells of the second row facing, and connected by a further portion of the fuse device to, a second face of the first common electrode, wherein melting the portion or the further portion of the fuse device isolates a single one of the plurality of battery cells;
a thermally conductive flexible gasket; and
a second common electrode coupled to the first electrode of each battery cell, and coupled to the case by the thermally conductive flexible gasket.

14. The encased battery assembly of claim 13, further comprising;
an insulating outer surface layer on an exterior of the case, wherein an interior of the case has the electrical conductivity.

15. The encased battery assembly of claim 13, further comprising:
a phase change material in the cavity and having thermal contact with the case and the plurality of battery cells.

16. The encased battery assembly of claim 13, further comprising:
the case having a plurality of chamfered edges, at least one of the plurality of chamfered edges configurable to form a pipeline channel when assembled to further encased battery assemblies.

17. The encased battery assembly of claim 13, further comprising:
a temperature sensor arranged to sense temperature of the case or at least one of the plurality of battery cells.

18. The encased battery assembly of claim 13, further comprising:
an exterior of the case having an anodizing treatment.

19. The encased battery assembly of claim 13, further comprising:
the second common electrode having a plurality of welding wire areas; and
a plurality of wires, each of the plurality of wires coupling the second common electrode to the first electrode of one of the plurality of battery cells through one of the plurality of welding wire areas.

20. The encased battery assembly of claim 13, wherein the fuse device comprises a plurality of fuse wires, each of the plurality of fuse wires individual to one of the plurality of battery cells.

* * * * *